March 15, 1932. D. MARTIN 1,849,678
TRACTION WHEEL
Filed Jan. 25, 1929 3 Sheets-Sheet 1

Inventor
D. Martin

March 15, 1932.   D. MARTIN   1,849,678
TRACTION WHEEL
Filed Jan. 25, 1929   3 Sheets-Sheet 2
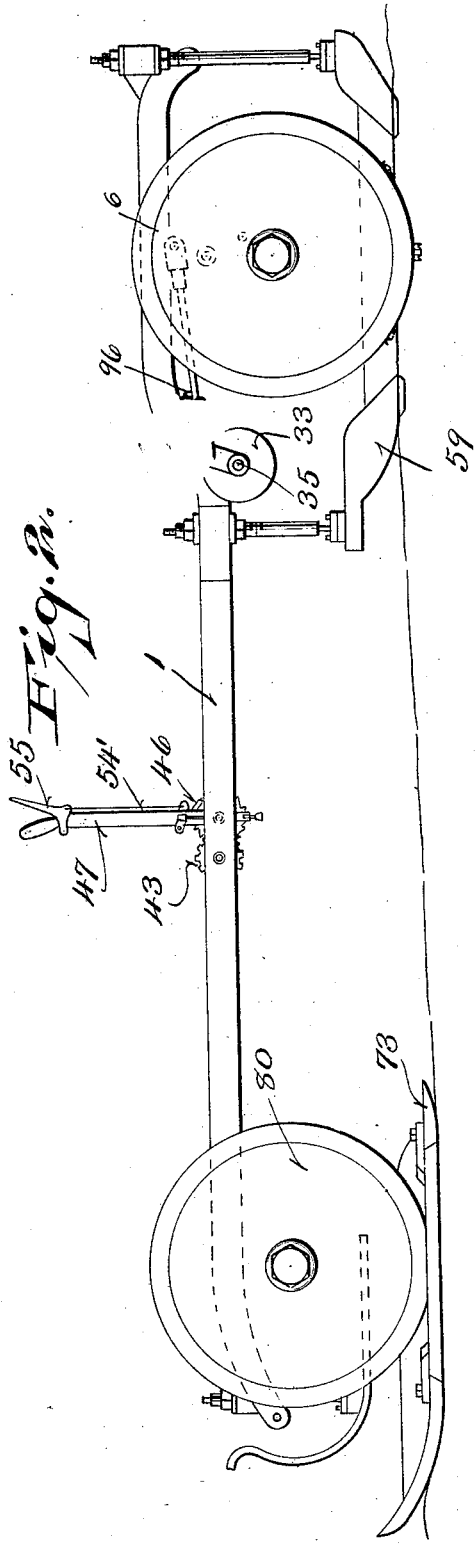
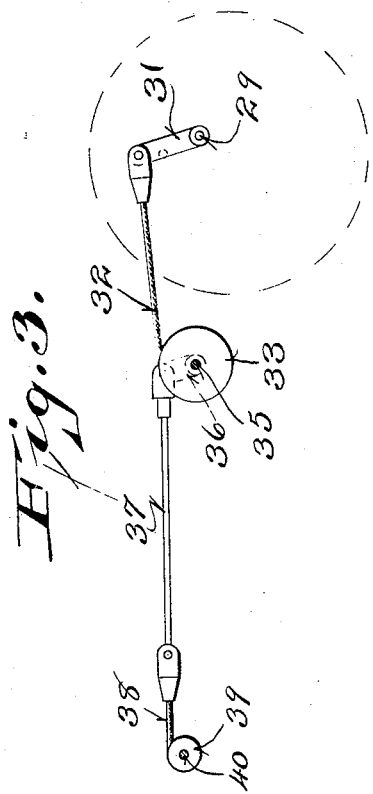
Inventor
D. Martin March 15, 1932.  D. MARTIN  1,849,678
TRACTION WHEEL
Filed Jan. 25, 1929  3 Sheets-Sheet 3
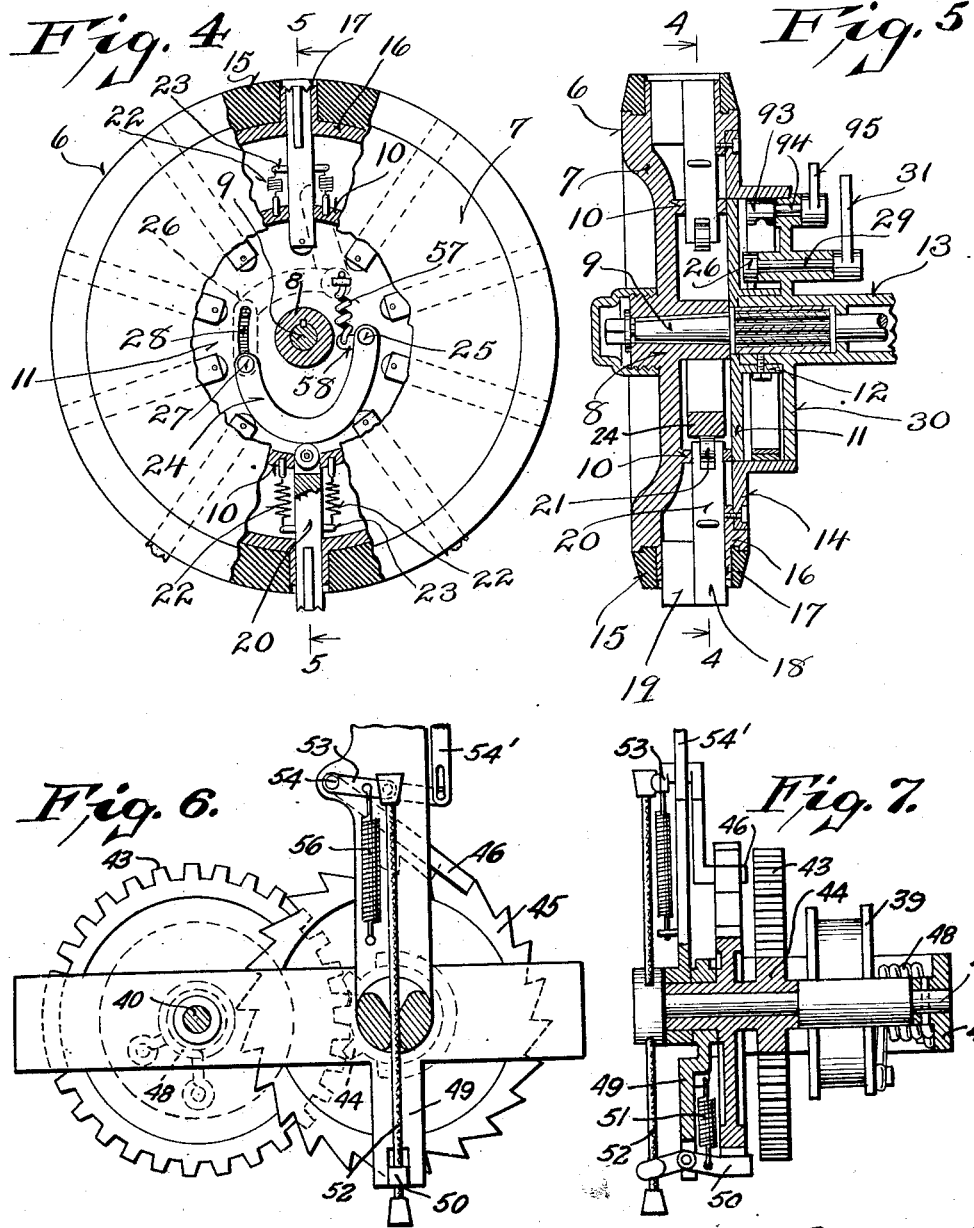

Patented Mar. 15, 1932

1,849,678

UNITED STATES PATENT OFFICE

DANIEL MARTIN, OF MILWAUKEE, WISCONSIN

TRACTION WHEEL

Application filed January 25, 1929. Serial No. 334,950.

This invention relates to improvements in traction wheels.

An object of my invention is the provision of a traction wheel, which is provided with a novel type of calk which is protracted during the rotation of the wheel so as to readily contact with the surface over which the wheel is traveling and thence to be retracted after contacting with the surface.

A further object of my invention is the provision of a vehicle wherein calks of a novel type are used in the traction wheels and novel means are provided for protracting the calks during the rotation of the wheels so that the calks will be protracted only on that side of the wheels which is contacting the surface over which the vehicle is traveling and suitable means are provided for maintaining the calks in a normally retracted position within the confines of the traction wheels.

A still further object is the provision of novel means for protracting the calks in the traction wheels and additional means for displacing the calk operating means whereby all of the calks will be maintained in a retracted position while the wheels are traveling over a smooth and unbroken surface which is free from ice or snow and upon which surface the calks would not be needed.

With the above and other objects in view, the invention consists in the novel features of construction, the combination and arrangement of parts hereinafter more fully set forth, pointed out in the claim and shown in the accompanying drawings wherein:

Figure 2 is a side elevation;

Figure 3 is a detailed side elevation of parts of the operating mechanism for protracting the calks;

Figure 4 is a section on the line 4—4 of Figure 5, parts being shown in elevation.

Figure 5 is a section on the line 5—5 of Figure 4;

Figure 6 is a side elevation, parts being shown in section, of the operating mechanism which controls the cam operator for the calks;

Figure 7 is a longitudinal section of the device shown in Figure 6.

Figure 1:
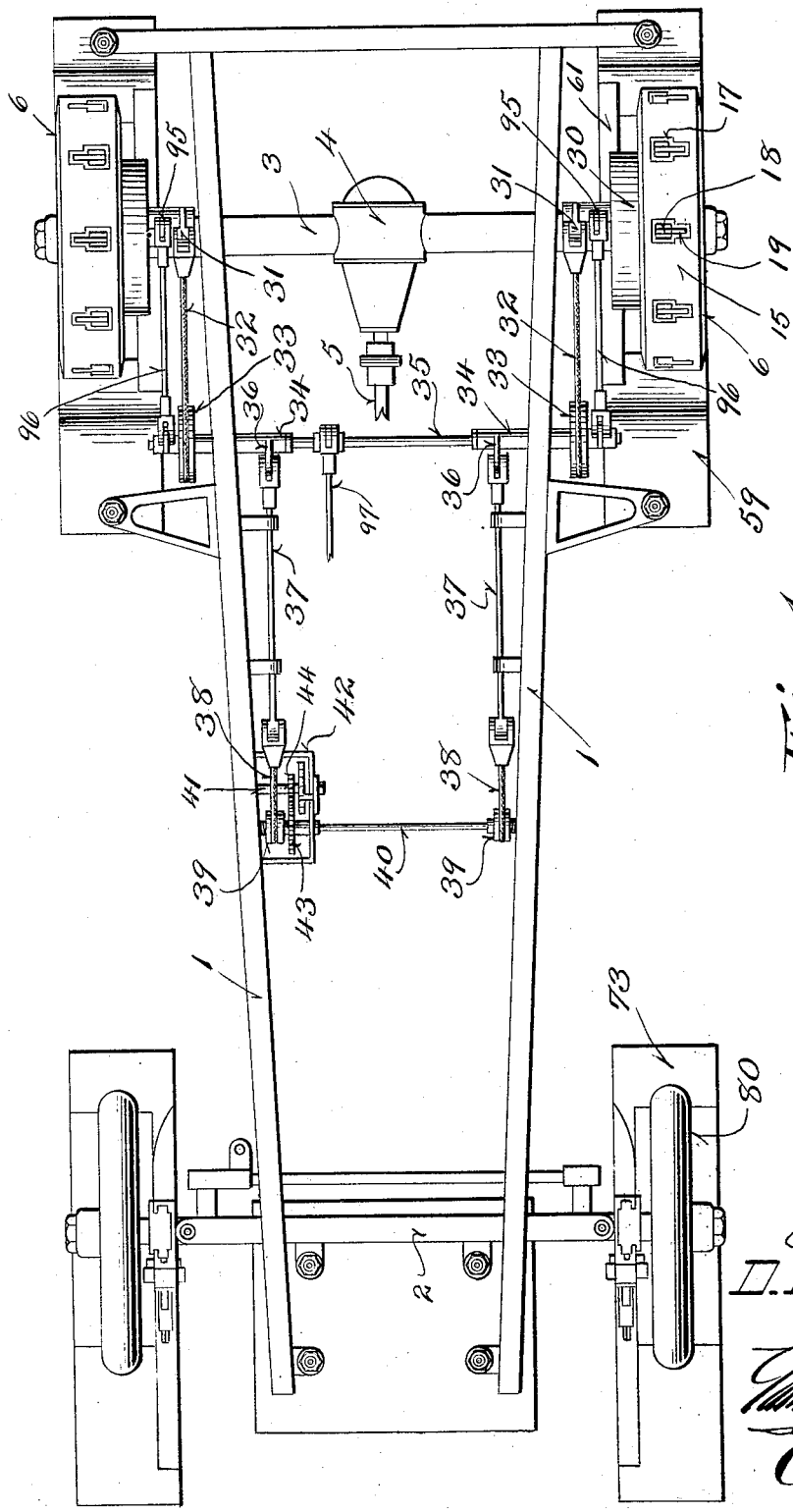
Figure 1 is a top plan view of the chassis of a motor vehicle sled equipped with my improved traction wheels.

In carrying out my invention, I provide chassis 1, a front axle 2 and a rear axle 3 with a transmission housing 4 and shaft 5 for the transmission. At each end of the rear axle 3 is a traction wheel 6. These wheels 6 comprises a face plate 7 supporting a spindle sleeve receiving the spindle 9 of the axle 3. Extending inwardly from the face plate 7 is an annular rib 10 forming a chamber between the spindle sleeve 8 and the annular rib 10.

The housing formed by the rib 10 is normally closed by means of a plate 11 which carries upon its outer face a cuff 12, receiving therein one end of the rear axle housing 13. Removably attached to the inner side of each of the rear traction wheels 6 is an angular ring 14, one side of which forms an annulus spaced from the cuff 12, while the other side thereof is detachably connected to portions of the traction wheel upon the inner side thereof.

The tread of the traction wheels is preferably of hard rubber as shown at 15 and is secured to the outer annular portion 16 in any suitable manner. Extending outwardly from the annular portion 16 and at spaced intervals throughout the circumference of the wheels are the sleeves 17 which extend through suitable openings in the tread 15 and which are preferably formed for slidably receiving therein the calks 18.

It will be noted that the outer ends of the calks which are to be protracted, are formed with lateral extensions 19, providing a double face for the calk. These calks 18 have their shank portions 20 slidably mounted in suitable openings formed in the annular rib 10, the inner ends of the shanks 20 extending into the central housing of the wheels as clearly shown in Figures 4 and 5. The inner ends of the shanks 20 are provided with contact rollers 21 which are mounted in the inner ends of the shanks 20, and these mountings are preferably on roller bearings to assure free and easy movement of the rollers 21.

The calks are normally maintained in a retracted position through the medium of the coil springs 22 which are disposed upon opposite sides of the shank 20, between the outer annular portion 16 and the rib 10. The inner ends of these springs are connected to the rib 10, while the outer ends thereof are attached to lateral pins 23 extending from opposite sides of the shank. From this, it will be apparent that the tension of the springs 22 will maintain the calks 18 in a retracted position as shown at the upper parts of Figures 4 and 5.

New and improved means are provided for causing the calks to be protracted during the movement of each wheel over a surface and this means includes an arcuate cam member 24, one end of which is pivoted on a stub shaft 25 carried by the brake housing 30 and the other end connected to a pair of links 26 by means of a pin 27. This pin 27 operates in a slot 28, formed in the plate 11.

The links 26 are connected with a stub shaft 29 supported by the brake housing 30. The stub shaft 29 has thereon an arm 31, the outer end of which is connected by means of a cable 32 to a drum 33 fastened to a sleeve 34 which in turn is rotably mounted upon a transverse axle 35, which will be known as the brake operating axle or shaft.

Extending outwardly from the sleeve 34 at each side of the chassis are the arms 36 connected by means of rods 37 to the cables 38. At one side of the chassis, I provide suitable operating mechanism for the drums 39 upon which the cables 38 are to be wound. This operating medium includes a shaft 40 on which the drums 39 are mounted and in addition to the shaft 40, I provide a stub shaft 41 lying parallel with the shaft 40 and arranged within a suitable housing 42. Mounted upon the shaft 40 adjacent the drum 39 thereof is a gear 43 meshing with the pinion 44 on the stub shaft 41. On the stub shaft 41 is a ratchet wheel 45 adapted to be engaged by a pawl 46 on the hand lever 47 which is mounted upon the stub shaft 41.

It will be apparent from the foregoing that through movement of the lever in one direction when the pawl 46 is engaged with the teeth of the ratchet 45, the stub shaft 41 and shaft 40 will be rotated in opposite directions, the shaft 40 rotating the drums 39 to wind the cables 38 thereon, any retrograde movements on the part of the ratchet 45 being prohibited by the pawl 46.

The shaft 39 carries thereon suitable coil springs 48, each having one end secured to the drum and the other end secured to the frame or chassis of the machine, so that when the cable 38 is wound upon the drums 39, the springs 48 will be placed under tension. Mounted upon the stub shaft and extending downwardly therefrom, is a bracket 49 supporting on its lower end a pivoted catch finger 50 which extends laterally from opposite sides of the bracket with one end thereof engaging the teeth of the ratchet 45 to securely hold the same against movement. The finger 50 is normally urged toward the teeth of the ratchet 45 through the medium of a coil spring 51. The other end of the finger 50 is attached to a cord 52 which in turn is connected to the pivoted arm 53 on the hand lever 47.

The arm 53 is operatively connected to the movable hand hold 55 through the medium of a pin 54 and a link 54'. The hand hold 55 is pivoted to the upper end of the hand lever 47 for movement toward and away from the hand grip of the lever. The arm 53 is normally maintained in a lowered position by means of the coil spring 56, one end of which is attached to the lever 47 adjacent its pivot point and the other end attached to the arm 53.

This arm 53 not only controls the movement of the cord 52, but also the ratchet 45, so that when the link 54 is raised, the pawl 46 and the catch finger 50 are both simultaneously disengaged from the ratchet 45 to release the ratchet and permit the unwinding of the drums 39, which will be carried out by means of the tension of the springs 48.

From the above it will be apparent that when it is desired to move the cam member 24 to an operative position as shown in Figure 4, the hand lever 47 is actuated for winding the cables 38 on the drums 39, this action places a spring 57 under tension. The spring 57 has one end connected to a perforated ear 58 on the cam 24, at a point below its pivot, the other end of the spring being connected to a perforated ear on the plate 11, so that when the cam 24 is lowered to its operative position the spring 57 will be placed under tension. When it is desired to return the cam 24 to an inoperative position so that none of the calks 18 will be protracted, the ratchet 45 is released as explained above, permitting the cables 38 and 32 to unwind from the drums 39 and 33 respectfully, this action permitting the tension of the springs 57 to move the cam members 24 upwardly to an inoperative position, and they will be maintained in this position until again set for operation through the movement of the hand lever 47.

The braking mechanism for my improved vehicle includes the horizontally disposed part of the ring 14 which forms the annulus of the brake drum and the brake band 92 which, in the present instance is of the expanding type adapted to co-operate with the inner face of the horizontal portion of the ring 14 for braking the traction wheels. The brake is operated by means of a cam 93 on the stub shaft 94, said shaft having an arm 95 at its outer end and each arm is connected by means of a rod 96 to the brake operating shaft 35.

The shaft 35 is rotated through the medium of a rod 97 which is connected to the ordinary type of brake lever used on motor vehicles.

The rear wheels 6 and the front wheels 80 of the vehicle can be mounted respectively on runners 59 and 73, which form no part of the present application and the same will not be described in detail. The mounting of the runners on the vehicle chassis form the subject matter of another invention and will likewise not be described in detail. It is to be noted, however, that the front wheels 80 are of the ordinary type and that the same rest directly on the top faces of the runners 73, while the rear wheels 6 are of a special type (as described) and the rear runners 59 are consequently supported from the chassis of the vehicle, so that the wheels 6 can rotate freely and these runners 59 are cut away to permit the engagement of the wheels 6 with the snow to permit the driving of the vehicle.

While I have shown and described the preferred embodiment of my invention, it will be apparent that slight changes may be made in the construction when putting the invention into practice without departing from the spirit of the same or the scope of the appended claim.

I claim:

A traction wheel including a face plate, an annular rib extending inwardly from said face plate to form a circular housing, a closure plate for the housing opposite the face plate, a circular cuff carried by the closure plate, an angular ring extending around said closure plate with one side forming an anulus space from the cuff to provide an annular housing and the other side detachably connected to the wheel, a cover plate for the latter housing, a shaft rotatably mounted in said cover plate, calks movable through the outer annular portion of the wheel, a cam member in the first housing for engaging the inner ends of the calks for projecting them through the outer annular portion, means operatively connecting the cam member with said shaft, means for rotating said shaft to actuate said cam member, and means for normally maintaining said calks in a retracted position.

In testimony that I claim the foregoing and have hereunto set my hand at Milwaukee, in the county of Milwaukee and State of Wisconsin.

DANIEL MARTIN.